July 13, 1954
M. BITZER
2,683,275
POWER DRIVE FOR WINDSHIELD CLEANERS
Filed Dec. 8, 1950
4 Sheets-Sheet 1
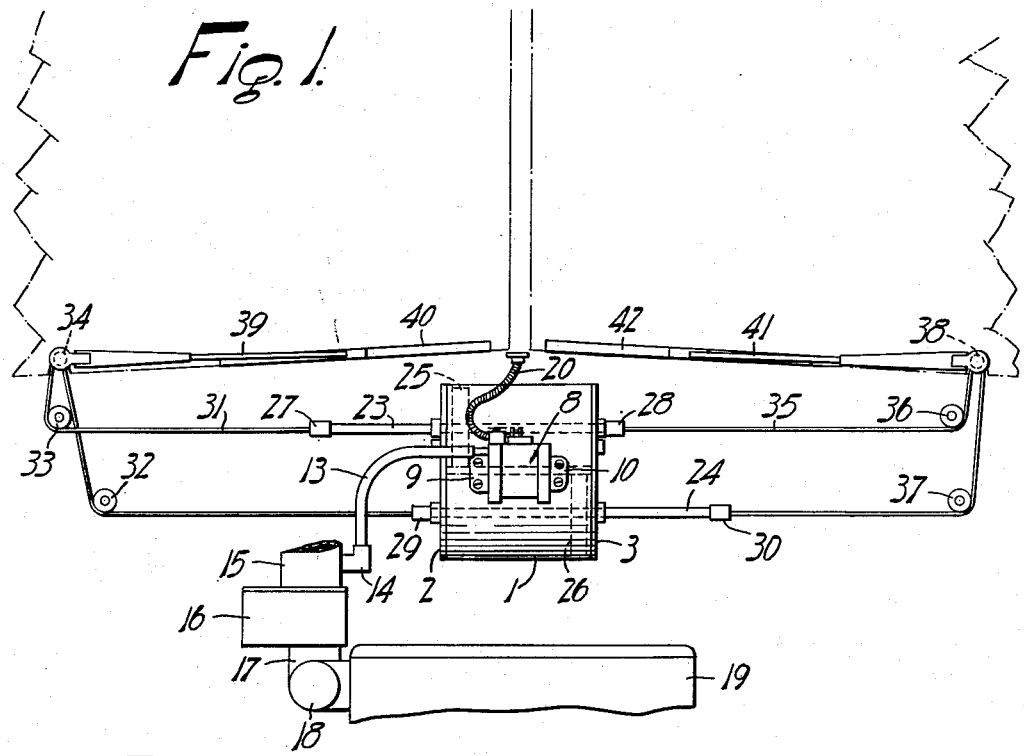
Fig. 1.
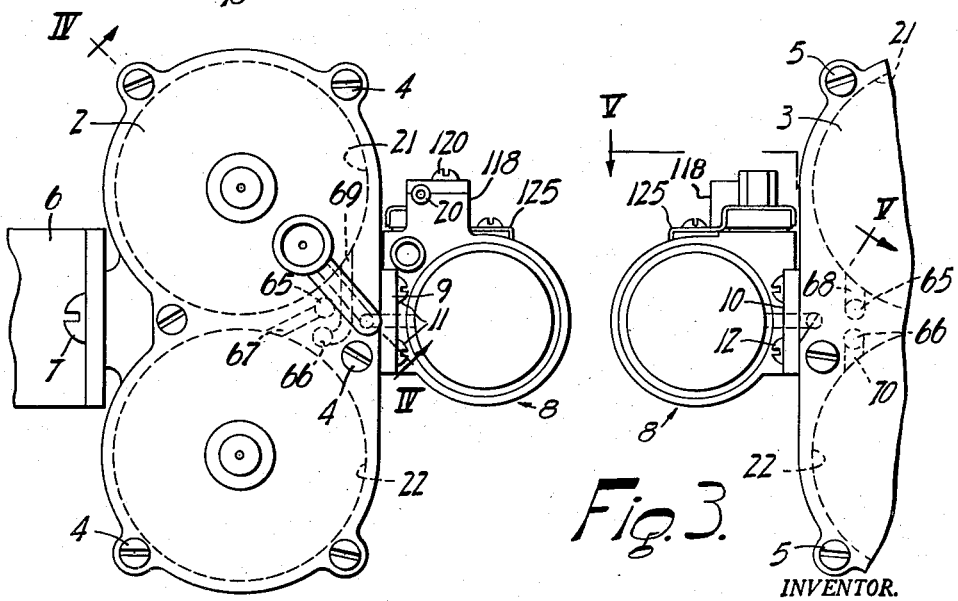
Fig. 2.
Fig. 3.
INVENTOR.
Martin Bitzer
BY
Bean, Brooks, Buckley & Bean.
ATTORNEYS

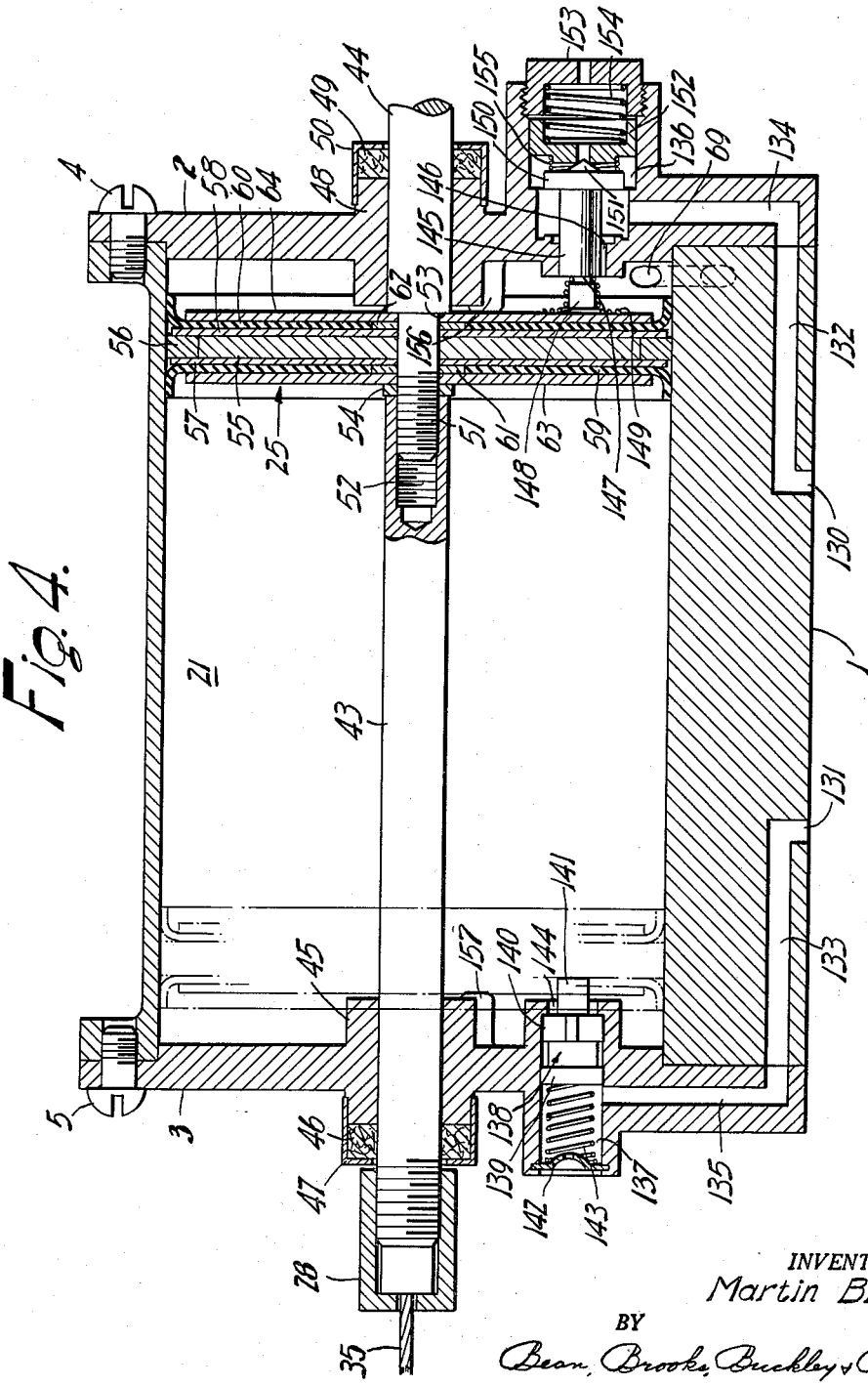

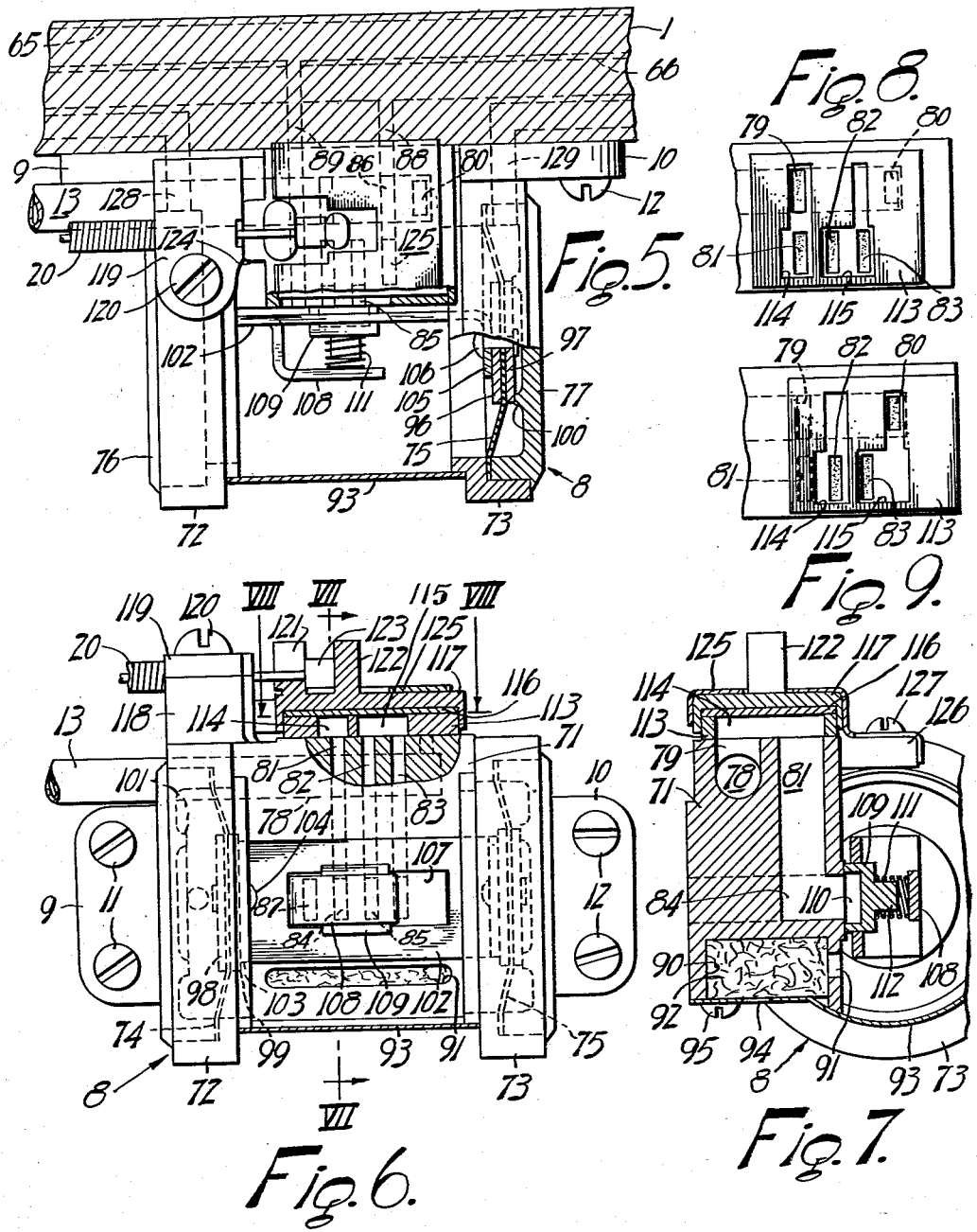

July 13, 1954  M. BITZER  2,683,275
POWER DRIVE FOR WINDSHIELD CLEANERS
Filed Dec. 8, 1950  4 Sheets-Sheet 4
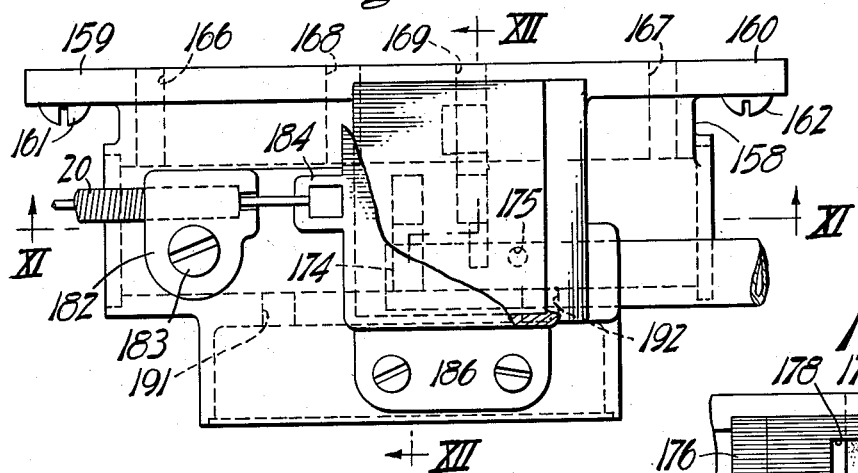
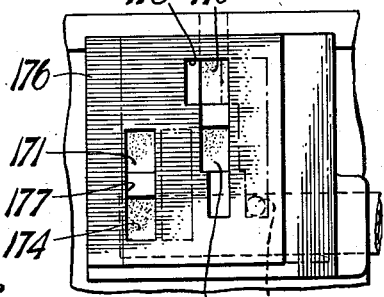
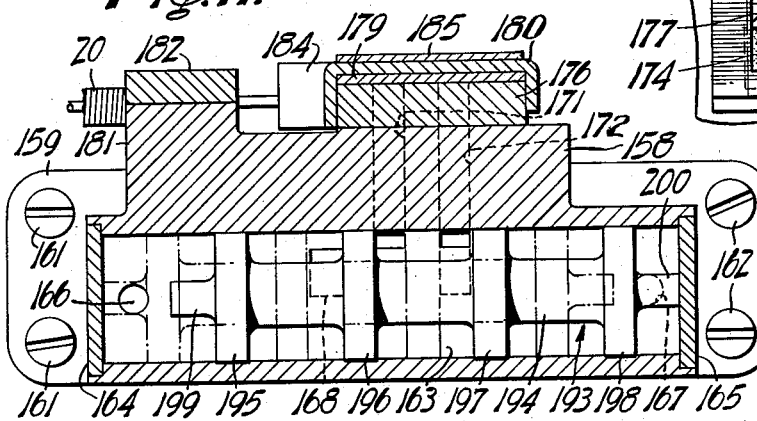
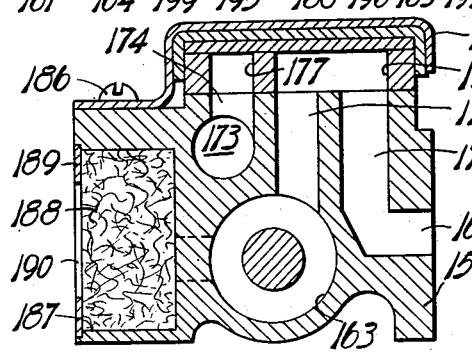
INVENTOR.
Martin Bitzer
BY
Bean, Brooks, Buckley & Bean.
ATTORNEYS Patented July 13, 1954

2,683,275

UNITED STATES PATENT OFFICE 2,683,275

POWER DRIVE FOR WINDSHIELD CLEANERS

Martin Bitzer, Kenmore, N. Y., assignor to Trico Products Corporation, Buffalo, N. Y.

Application December 8, 1950, Serial No. 199,811

10 Claims. (Cl. 15—253)

This invention relates generally to the windshield cleansing art, and more particularly to an improved windshield cleaner of the type wherein one or more wiper blades are caused to oscillate across a windshield surface whereby to cleanse predetermined areas thereof.

It is an object of this invention to provide a windshield cleaner wherein the driving means are both quiet and positive in operation.

Another object of this invention is to provide a windshield cleaner which is powerful, by reason of its having dual driving motors, and at the same time is compact, so as to occupy a minimum amount of space.

A further object of this invention is to provide a windshield cleaner having simplified automatic control means serving to impart an oscillatory motion to the wiper blades.

In addition, it is an object of this invention to provide a windshield cleaner incorporating means permitting the wiper blades to traverse a predetermined fixed path of movement without contacting the edge portions of the windshield and causing the wiping blades to assume a parked position adjacent the bottom edge of the windshield.

With the foregoing and other objects in view, this invention comprises certain novel features and combinations of parts to be fully disclosed in the ensuing detailed description.

For a better understanding of the present invention, reference is hereby made to the accompanying drawings in which like reference numerals are used to denote like parts throughout the various views and in which:

Fig. 1 shows the entire windshield cleaner assembly installed in place on the front portion of a vehicle;

Fig. 2 is a side view looking to the right in Fig. 1 showing the dual suction motors used to drive the windshield cleaner together with the donkey engine control means therefor;

Fig. 3 is a fragmentary side view similar to Fig. 2 but looking to the left in Fig. 1;

Fig. 4 is a sectional view of one of the suction motors taken along the line IV—IV of Fig. 2;

Fig. 5 is a view of the donkey engine, partly in section, taken along the line V—V of Fig. 3;

Fig. 6 is a side view, partly in section, of the donkey engine;

Fig. 7 is a sectional view of the donkey engine taken along the line VII—VII of Fig. 6;

Fig. 8 is a fragmentary view taken along the line VIII—VIII of Fig. 6 and showing the donkey engine controller in running position;

Fig. 9 is a fragmentary plan view similar to Fig. 8 but showing the donkey engine controller in park position;

Fig. 10 is a plan view, partly in section, of a modified form of donkey engine;

Fig. 11 is a sectional view taken along the line XI—XI of Fig. 10;

Fig. 12 is a sectional view taken along the line XII—XII of Fig. 10; and

Fig. 13 is a fragmentary plan view of the controller for the modified donkey engine.

Despite the many technical advances which have been made in the windshield cleansing art, numerous problems have remained unsolved. For example, one of these problems is the commonly experienced slapping of the wiper blades against the windshield molding. The noise thus produced is a source of constant irritation to the operator of a vehicle, and is a potential source of danger in that it tends to detract from the operator's concentration on his driving. Previous attempts to solve this problem have for the most part proved unsatisfactory, since they frequently require a reduced sweep of the wiper blade, or parking the wiper blade away from the bottom edge of the windshield and in the operator's path of vision, both of which are undesirable situations.

Another such problem is that the windshield cleaner must compete with numerous other automotive accessories for what is a limited installation space, and as a result must be made as compact as possible. This problem is complicated by the fact that a relatively large amount of power must be produced if the windshield cleaner is to operate satisfactorily.

The present invention solves these and other existing problems, in accordance with the aforesaid objects, as will become apparent from the following description.

Basically, the present invention comprises a windshield cleaner having dual suction motors connected to the wiper blades by an endless drive arrangement and with a single donkey engine control means for both said motors.

The dual suction motors are mounted in a single unitary casing 1 having end plates 2 and 3 secured thereto by means of a plurality of bolts 4 and 5. Motor casing 1 is secured at one side to a bracket 6 by means of bolt 7, bracket 6 being adapted for attachment to some part of the vehicle such as the firewall thereof, not illustrated, by any conventional means.

Mounted on the other side of motor casing 1 is a donkey engine 8 having ears 9 and 10 which are secured to said casing by means of bolts 11 and 12. A vacuum line 13 extends from donkey engine 8 and is secured to a coupling 14 in the air intake 15 of carburator 16. A connection 17 extends between carburator 16 and intake manifold 18, which latter is in turn connected to engine block 19. A Bowden wire 20 extends from the donkey engine 8 to the driver's compartment of the vehicle, as shown.

Motor casing 1 has two cylindrical bores 21 and 22 therein. Each of cylindrical bores 21 and 22 has a piston rod 23 and 24, respectively, journaled for reciprocating movement therein. Piston elements 25 and 26 are mounted on piston rods 23 and 24, respectively, to impart a back and forth or reciprocatory movement thereto. Attaching caps 27 and 28 are threadedly mounted on each end of piston rod 23, and attaching caps 29 and 30 are threadedly mounted on each end of piston rod 24. A flexible cable 31 is attached at one end to attaching cap 27 and at its other end to attaching cap 29. Cable 31 extends around pulleys 32 and 33 which are attached to the vehicle, and around a rockshaft 34 in driving engagement therewith. A flexible cable 35 is attached at one end to attaching cap 28 and at its other end to attaching cap 30. Cable 35 extends around pulleys 36 and 37, which are attached to the vehicle, and around a rockshaft 38 in driving engagement therewith. In this manner, cables 31 and 35 and piston rods 23 and 24 combine to form in effect an endless drive. An actuating arm 39 carrying a wiper blade 40 at its outer end is mounted at its inner end on rockshaft 34, and an actuating arm 41 carrying a wiper blade 42 on its outer end is mounted upon rockshaft 38. Therefore a back and forth movement of piston rods 23 and 24 will impart an oscillatory motion to wiper blades 40 and 42, causing them to cleanse predetermined areas of the windshield.

Referring more in detail to the suction motor, particularly as shown in Fig. 4 of the drawings, it is seen that piston rod 23 is composed of two members 43 and 44. Member 43 is journaled in bearing 45 on end wall 2 and is held in sealed relation therewith by means of packing gland 46 which is secured to bearing 45 by means of a cover plate 47. Similarly, member 44 is journaled in bearing 48 on end wall 3 and maintained in sealed relation therewith by means of packing gland 49 and secured to bearing 48 by means of a cover plate 50. Member 44 has an inner end portion 51 of reduced diameter which fits within a threaded opening 52 on the inner end of a member 43. Said portion 51 provides a shoulder 53 on member 44. Piston element 25 is mounted on reduced portion 51 with one side bearing against shoulder 53 and its other side bearing against a nut 54 held in place on reduced portion 51 by the inner end of member 43. Piston rod 24 is formed in a manner identical with piston rod 23.

Piston element 25 comprises a center plate 55 of less diameter than bore 21 and a ring 56 of the same thickness as plate 55 mounted therearound and abutting against the wall of bore 21. Plates 57 and 58 are pressed against each side of plate 55 and ring 56. Flexible washers 59 and 60, of a diameter larger than bore 21, lie against plates 57 and 58 respectively, and have metallic washer elements 61 and 62 at the respective centers thereof. Plates 63 and 64 bear against washers 59 and 61, and 60 and 62, respectively, and are held in place thereagainst by means of nut 54 and shoulder 53. Piston element 26 is formed in a manner identical with piston element 25.

Within motor casing 1, and extending longitudinally thereof, are two passageways 65 and 66. At its left hand end, as viewed in Fig. 5, passageway 65 communicates with bore 22 through port 67, and at its right hand end passageway 65 communicates with bore 21 through a port 68. Passageway 66 communicates at its left hand end with bore 21 through a port 69, and communicates at its right hand end with bore 22 by means of a port 70. It is noted at this time that the right hand end of Fig. 4 corresponds to the left hand end of Figs. 1 and 5.

Passageways 65 and 66 are alternately and reversibly connected, in a manner to be described, to the atmosphere and to a vacuum creating means, whereby to create a reversible pressure differential acting against piston elements 25 and 26. In this manner, piston elements 25 and 26 are driven back and forth in opposite directions causing the endless cable to oscillate wiper blades 40 and 42 back and forth across the windshield in a fixed path of movement.

The donkey engine 8, shown in detail in Figs. 5, 6 and 7, comprises a cast body portion 71 having end mounting rings 72 and 73 formed integral therewith. Attaching ears 9 and 10, previously referred to, are formed integral with body portion 71, and threaded bolts 11 and 12 extend through ears 9 and 10 and serve to attach donkey engine 8 to motor casing 1. Flexible diaphragms 74 and 75 are mounted in place with mounting rings 72 and 73, and end caps 76 and 77 are mounted in place on the outer side of mounting rings 72 and 73, serving to lock flexible diaphragms 74 and 75 in place therein.

Vacuum line 13 is connected to a longitudinal exhaust passageway 78 within body portion 71, which passageway communicates with the exterior of body portion 71 through vertical ports 79 and 80. Body portion 71 also has vertical passageways 81, 82 and 83 extending from the top portion thereof to a point near the bottom thereof. Passageways 81 and 82 are placed in communication with the exterior of body portion 71 at their lower ends by means of horizontal transverse ports 84 and 85. Body portion 71 also has a horizontal transverse passageway 86 which communicates with passageway 83 at its forward end and extends to the rear side of body portion 71. Another transverse horizontal passageway 87 extends completely through body portion 71. Passageway 86 is in communication with a port 88 in motor casing 1, and passageway 87 is in communication with a second port 89 in motor casing 1. Ports 88 and 89 communicate with longitudinal passageways 66 and 65, respectively.

Body portion 71 has a recess 90 on its underside, and a longitudinal opening 91 in the front wall of said recess. A filter packing 92 is placed within said recess 90, and is held therein by means of a cover plate 93. Cover plate 93 is apertured, as at 94 and it attached to the underside of body portion 71 by means of a threaded bolt 95. Cover plate 93 extends around the inner side of mounting rings 72 and 73 and into engagement with the top of body portion 71. Thus, through the use of control means presently to be described, passageways 65 and 66 can reversibly and alternately be placed in communication with the atmosphere and with vacuum line 13, whereby to create a reversible pressure differential acting against piston elements 25 and 26.

Plates 96 and 97 are mounted on each side of the central portion of flexible diaphragm 75, and corresponding plates 98 and 99 are mounted on each side of the central portion of flexible diaphragm 74. Plate 97 is adapted to abut against raised cylindrical portion 100 on end cap 77, and plate 98 is adapted to abut against raised cylindrical portion 101 on end cap 76. A U-shaped guide member 102 extends between flexible diaphragms 74 and 75. Guide member 102 is connected at one end 103 to plates 98 and 99 and flexible daphragm 74 by means of a rivet 104, and at its other end 105 to plates 96 and 97 and flexible diaphragm 75 by means of a rivet 106, the arrangement being such that diaphragms 74 and 75 and guide member 102 move together in the same direction.

Guide member 102 has a cut-out portion 107 therein with a flange 108 extending outwardly therefrom in the form of an L. A valve element 109 having a recess 110 is securely mounted within guide member 102, and bears against body portion 71. Valve element 109 is spring biased against body portion 71 by means of a spring 111 extending between flange 108 and a boss 112 on valve element 109. Valve element 109 is so mounted on guide member 102, and recess 110 is of such size, as to place port 84 in communication with either port 85 or passageway 87, depending upon the position of diaphragms 74 and 75, the other of port 85 or passageway 87 being in communication with the atmosphere. The complete operation of valve element 109 will be explained in detail subsequently, and as will more fully appear hereinafter valve element 109 comprises a power valve for reversing the pressure differential in the motors.

Mounted for movement across the top of body portion 71 is a plate 113 having openings 114 and 115 therein. Opening 114 is of a shape to place passageway 81 in communication with port 79, and opening 115 is of a shape to place passageway 83 in communication with either passageway 82 or port 80, depending upon the position of plate 113. A cover plate 116 is placed on top of plate 113, and a plate 117 having depending side walls fits over cover plate 116 and around plate 113.

Body portion 71 has a raised boss 118 at one end of the top thereof, which boss has a groove therein. A correspondingly grooved cover plate 119 is mounted thereon by means of bolt 120. Bowden wire 20 is received within said grooves and extends longitudinally therethrough. Plate 117 has two spaced raised portions 121 and 122 thereon. Bowden wire 20 extends through raised portion 121 and is attached to a wedge 123 which fits between raised portions 121 and 122. In this manner actuation of Bowden wire 20 causes plate 113 to change position on the top of body portion 71. A projection 124 on plate 117 is adapted to abut boss 118 and forms a stop member. Plates 113, 116 and 117 are held against the top of body portion 71 by means of a cover member 125 which extends over plate 117 and is secured to a projection 126 on body portion 71 by means of bolt 127. Cover member 125 is cut away so as to longitudinally receive raised portions 121 and 122.

The flexible diaphragms 74 and 75 are actuated by a reversible pressure differential in the following manner.

Horizontal transverse passageways 128 and 129 extend from the space between flexible diaphragm 74 and end cap 76, and flexible diaphragm 75 and end cap 77, respectively, to the rear of body portion 71. There they communicate with ports 130 and 131 which form one end of longitudinal passageways 132 and 133 in motor casing 1. At their other end, passageways 132 and 133 communicate with passageways 134 and 135 in end caps 2 and 3, respectively. Passageways 134 and 135 extend to recesses 136 and 137 in said respective end caps.

A valve element 138 is mounted for longitudinal movement within recess 137, and has an end 139 of the diameter of the recess, a member 140 of the diameter of the recess but having grooves therein, and a boss 141 on the other end thereof. An apertured plate 142 covers one end of recess 137, and a spring 143, extending between plate 142 and end 139 of valve element 138 biases the latter to its innermost position. The other end of recess 137 has an opening 144 of reduced diameter which will receive boss 141 but not member 140.

A parking valve element 145 is journaled in the inner wall of recess 136, which wall has an opening 146 therein. A boss 147 of reduced diameter extends from parking valve 145 and has an enlarged portion 148 thereon. A helical spring 149 is secured to boss 147 and raised portion 148, and extends into abutting engagement with piston element 25. At its other end, valve 145 has an enlarged end portion 150 with a conical tip 151 thereon. End portion 150 is adapted to abut against the inner end of recess 136. Recess 136 is enlarged throughout a portion of its length, and a recessed member 152 is mounted for sliding movement within said enlarged portion. A correspondingly recessed member 153 is threadedly mounted in the outer end of recess 136, the recesses of members 152 and 153 cooperating to hold the opposite ends of a compression spring 154. Members 152 and 153 are apertured with the conical tip 151 of end portion 150 adapted to seal the aperture in member 152. A spring 155 is interposed between end portion 150 and member 152. In addition, stop members 156 and 157 are provided on the inner side of end walls 2 and 3 respectively, so as to provide positive stop means for piston element 25.

It is noted that valve elements 138 and 145 are provided only in conjunction with bore 21, but serve to control both motors and in effect comprise pilot valve means controlling the donkey engine power valve means.

The operation of this invention is as follows:

As illustrated, the windshield cleaner has been stopped with wiper blades 40 and 42 assuming a parked position along the bottom edge of the windshield. However, Bowden wire 20 has just been actuated to move cover plate 113 to its running position as shown in Fig. 8, whereby to initiate a windshield cleansing operation. In this position a cover plate 113, the left hand side of piston 25 and the right hand side of piston 26, as viewed in Figs. 1 and 5, are subject to exhaust through ports 69 and 70, passageway 66, port 88, and passageways 86 and 83, the opening 115 in cover plate 113, passageway 82, port 85, recess 110 in valve member 109, port 84, passageway 81, opening 114 in cover plate 113, port 79, passageway 78 and vacuum line 13. The right hand end of piston 25, and the left hand end of piston 26, as viewed in Figs. 1 and 5, are subject to atmospheric pressure through ports 68 and 67, passageways 65, port 89, passageway 87, the interior of cover plate 93, opening 91, filter packing 92, and opening 94. Since the piston elements are already at the positions to which the pressure differential thus created tends to move them, they will not move.

However, during the previous parking movement of piston element 25, flexible diaphragms 74 and 75 will have flipped over to the left as viewed in Figs. 5 and 6, carrying valve member 109 with them. This occurs because valve element 138, being biased to its innermost position, places the area between flexible diaphragm 75 and end cap 77 in communication with the atmosphere through passageway 129, port 131, passageways 133 and 135, recess 137, and the aperture in plate 142. At the same time, the area between flexible diaphragm 74 and end cap 76 is subjected to a partial vacuum through passageway 128, port 130, passageways 132 and 134, recess 136, opening 146, and the area between piston element 25 and end wall 3, which area is subjected to a partial vacuum as previously explained.

Therefore the flexible diaphragms 74 and 75 will have flipped over with valve member 109 placing port 84 in communication with passageway 87, and leaving port 85 open to the atmosphere.

In this position of valve member 109, with cover plate 113 still in running position, the right hand side of piston element 25, and the left hand side of piston element 26, as viewed in Fig. 1, will be subject to an exhaust action through ports 68 and 67, passageway 65, port 89, passageway 87, recess 119, port 84, passageway 81, opening 114 in cover plate 113, port 79, passageway 78, and vacuum line 13. At the same time, the left side of piston element 25, and the right hand side of piston element 26, as viewed in Fig. 1, are subjected to atmospheric pressure through ports 69 and 70, passageway 66, port 88, passageways 86 and 83, opening 115, passageway 82, port 85, the interior of cover 93, opening 91, filter packing 92, and opening 94. The pressure differential thus created will drive piston elements 25 and 26 to the right and left respectively, as viewed in Fig. 1, causing wiper blades 40 and 42 to move to their outermost position on the windshield.

As soon as piston element 25 moves to the right, as viewed in Fig. 1, the left as viewed in Fig. 4, spring 154 will move member 152 against the inner end of the enlarged portion of recess 136, and spring 155 will force end portion 150 of valve 145 against the inner wall of recess 136. This places the area between flexible diaphragm 74 and end cap 76 in communication with the atmosphere through the apertures in members 152 and 153, recess 136, passageways 134 and 132, port 130, and passageway 128. As soon as piston member 25 reaches its dotted line position as shown in Fig. 4, it will abut boss 141 to force valve element 138 inwardly against the action of spring 143. This will place the area between flexible diaphragm 75 and end cap 77 in communication with vacuum line 13 through opening 144, the grooves in member 140, recess 137, passageways 135 and 133, port 131 and passageway 129. In this manner the pressure differential on diaphragm members 74 and 75 is reversed, causing them to flip back to the position shown in Figs. 5 and 6. When this occurs, the pressure differential acting against piston elements 25 and 26 is reversed, placing the left hand side of piston element 25, and the right hand side of piston element 26, as viewed in Fig. 1, in communication with vacuum line 13, and the right hand side of piston element 25 and the left hand side of piston element 26 in communication with the atmosphere, as previously explained. Piston elements 25 and 26 will then move to the left and to the right respectively, as viewed in Fig. 1, causing wiper blades 40 and 41 to return to their inner position which will be slightly away from the bottom edge of the windshield.

As soon as piston element 25 moves to the left as viewed in Fig. 1, the right as viewed in Fig. 4, spring 143 returns valve element 138 to its inner position, subjecting the area between flexible diaphragm 75 and end cap 77 to atmospheric pressure through the aperture in end plate 142, recess 137, passageways 135 and 133, port 131 and passageway 129. As piston element 25 nears the end of its path of movement, it abuts against spring 149 causing it to build up a pressure sufficient to overcome the pressure of spring 155. When this occurs valve element 145 will move inwardly until conical tip 151 closes the aperture in member 152. However, member 152 will not be moved outwardly from its position against the inner end of the enlarged portion of recess 136, because at this point the area between flexible diaphragm 74 and end cap 76 will be subject to an exhaust action through opening 146, recess 136, passageways 134 and 132, port 130, and passageway 128. The flexible diaphragms 74 and 75 will then flip over to their outer position causing piston elements 25 and 26 to reverse their respective directions of movement. Thus, piston element 25 reverses its direction of movement somewhat before it abuts stop 157.

This latter feature is of extreme importance because it causes the wiper blades to traverse a predetermined fixed path of movement well within the confines of the windshield molding, and permits the wiper blades to assume a parked position against the bottom edge of the windshield, thus eliminating the objectionable slapping of the wiper blades against the windshield molding and at the same time causing the wiper blades to assume a parked position which is out of the path of vision of the driver.

To illustrate this feature, let it be assumed that the piston element 25 has just begun its movement to the right, as illustrated in Fig. 4, the left as illustrated in Fig. 1, and that the driver actuates Bowden wire 29 to move plate 113 to its parked position as illustrated in Fig. 9. This will cause the left hand side of piston element 25 and the right hand side of piston element 26, as viewed in Fig. 1, to remain in communication with vacuum line 13 through ports 69 and 70, passageway 66, port 88, passageways 86 and 83, opening 115, port 80, and passageway 78. At the same time, the right hand side of piston 25 and the left hand side of piston 26, as viewed in Fig. 1, remain subject to atmospheric pressure through ports 68 and 67, passageway 65, port 89, passageway 87, the interior of cover 93, opening 91, filter packing 92 and opening 94. The pressure differential thus created remains the same even when piston element 25 abuts spring 149 to move valve 145 outwardly, causing the flexible diaphragms to flip over to their other position, because the exhaust connection remains the same, and the atmospheric connection is blocked, extending from passageway 87 to port 84, passageway 81 and opening 114.

Therefore piston 25 continues its movement, moving member 152 until member 152 abuts against member 153, at which point piston 25 will also abut stop 157 and cease its movement. This small amount of continued movement of piston 25 and consequently wiper blades 40 and 42, when plate 113 is in its park position, permits wiper blades 40 and 42 to assume a parked position against the bottom edge of the windshield, although during a windshield cleansing operation the wiper blades do not touch either the side or bottom edge of the windshield. In this manner, the present invention prevents the annoying slap of the wiper blades against the windshield moulding when a windshield cleansing operation is in progress, and at the same time causes the wiper blades to assume a parked position against the bottom edge of the windshield and out of the driver's path of vision whenever the windshield cleansing operation is arrested.

It is noted that this form of the invention is particularly desirable because diaphragms 74 and 75 provide hermetic seals for the two remote suction chambers, whereby the pressure differential applied to donkey engine 8 is fully utilized. There is no possible leakage of air since guide member 102 is connected to diaphragms 74 and 75 on the outer sides thereof, which sides are remote from the suction chambers, and there are no sliding joints into the suction chambers which require stuffing boxes or other packing. Thus, the controller is highly efficient and satisfactory operation can be achieved with a minimum of pressure.

A modified form of donkey engine is illustrated in Figs. 10 through 13, which modified form comprises a body portion 158 having attaching ears 159 and 160 integral therewith. Bolts 161 and 162 extend through ears 159 and 160, respectively, and serve to mount body portion 158 on motor casing 1. Body portion 158 has a cylindrical bore 163 extending longitudinally therethrough, and end caps 164 and 165 serve to cover the ends of bore 163. Passageways 166 and 167 extend from the rear of body portion 158 transversely therethrough, communicating with bore 163 at points near the ends thereof. At their opposite ends, passageways 166 and 167 are adapted to communicate with ports 130 and 131, respectively, in motor casing 1. A passageway 168 extends from the rear of body portion 158 transversely therethrough and communicates at one end with bore 163 at a point near the center thereof. At its other end, passageway 168 is adapted to communicate with port 89 in motor casing 1. A fourth passageway 169 extends from the rear body portion 158 transversely therethrough to a point near bore 163, at which point it communicates with a vertical passageway 170, extending upwardly to the top of body portion 158. At its other end, passageway 169 is adapted to communicate with port 88 in motor casing 1. Two other vertical passageways 171 and 172 extend from bore 163 to the top of body portion 158. A longitudinal passageway 173, within the top part of the body portion 158, is adapted for connection with vacuum line 13 and has two ports 174 and 175 extending therefrom to the top of body portion 158. Mounted for movement across the top of body portion 158 is a plate 176 having openings 177 and 178 therein. Opening 177 is adapted to place passageway 171 and port 174 in communication when plate 176 is in running position. Opening 178 is adapted to place passageways 170 and 172 in communication when plate 176 is in running position, and places passageway 170 and port 175 in communication when plate 176 is in park position. A cover plate 179 covers plate 176, and a plate 180 having depending sides forming a skirt fits thereover and therearound. A suitably grooved boss 181 is formed on body portion 158, and a correspondingly grooved member 182, secured thereto by a bolt 183, cooperates therewith for the reception of Bowden wire 20. The end of Bowden wire 20 is attached to a projection 184 on plate 180. A guide member 185 extends over plates 180, 179 and 176 and is attached to body portion 158 by means of bolts 186. In this way, plate 176 is permitted a longitudinal back and forth movement across the top of body portion 158, assuming either a running or a park position.

Body portion 158 has a recess 187 in the front part thereof, which recess is filled with a filter packing 188. Packing 188 is held in place within recess 187 by means of a plate 189 having an opening 190 therein. Passageways 191 and 192 extend transversely through body portion 158 between bore 163 and recess 187.

The bore 163 has a piston 193 therein. Piston 193 comprises a piston rod 194 having hubs 195, 196, 197 and 198, of the same diameter as the bore, formed integral therewith. The ends 199 and 200 of piston rod 194 are of reduced diameter and act as stop members.

The operation of this modified form of donkey engine is as follows.

Let it be assumed that piston elements 25 and 26 are in their park positions as illustrated in Fig. 1, and that plate 176 has just been moved to its running position, shown in solid lines in Fig. 13. Piston 193 will have moved to the dotted line position shown in Fig. 11, because the area between hub 198 and end cap 165 will have been exposed to atmosphere through passageway 167, port 131, passageways 133 and 135, recess 137 and the aperture in plate 142, and the area between hub 195 and end cap 164 will have been subject to exhaust through passageway 166, port 130, passageways 132 and 134, recess 136, opening 146, port 69, passageway 66, port 88, passageways 169 and 170, opening 178, passageway 172, bore 163 between hubs 196 and 197, passageway 171, opening 177, port 174 and passageway 173. The pressure differential thus created would have moved piston 194 to its dotted line position during the parking stroke of piston 25.

In this position, the right hand side of piston 25 and the left hand side of piston 26, as viewed in Fig. 1, will be subject to a partial vacuum through ports 68 and 67, passageway 65, port 89, passageway 168, bore 163 between hubs 196 and 197, passageway 171, opening 177, port 174, passageway 173 and vacuum line 13. At the same time, the left hand side of piston 25 and the right hand side of piston 26 as viewed in Fig. 1, will be subjected to atmospheric pressure through ports 69 and 70, passageway 66, port 88, passageways 169 and 170, opening 178, passageway 172, bore 163 between hubs 197 and 198, passageway 192, filter packing 188 and opening 190. The pressure differential thus created will cause pistons 25 and 26 to move to the right and left, respectively, as viewed in Fig. 1, which will in turn move cables 31 and 35 to impart movement to wiper blades 40 and 42, causing them to move outwardly upon the windshield.

As it nears the end of its movement to the right, as viewed in Fig. 1, piston 25 will abut against boss 141 on valve member 138, pushing the same outwardly against the action of spring 143. This will expose the area between hub 198 and end cap 165 to exhaust action through passageway 167, port 131, passageways 133 and 135, recess 137, grooved member 140 and opening 144. At the same time the area between hub 195 and end cap 164 will be subject to atmospheric pressure through passageway 166, port 130, passageways 132 and 134, recess 136, and the apertures in members 152 and 153. The pressure differential thus created causes piston 193 to move to the full line position shown in Fig. 11. In this position, the left hand side of piston 25 and the right hand side of piston 26, as viewed in Fig. 1, will be subject to exhaust through ports 69 and 70, passageway 66, port 88, passageways 169 and 170, opening 178, passageway 172, bore 163, passageway 171, opening 177, port 174, passageway 173 and vacuum line 13. At the same time, the right hand side of piston 25 and the left hand side of piston 26, as viewed in Fig. 1, will be subject to atmospheric pressure through ports 68 and 67, passageway 65, port 89, passageway 168, bore 163 between hubs 195 and 196, passageway 191, filter packing 188 and opening 190. Near the end of its path of movement, piston 25 will abut spring 149 to move valve 145 outwardly, causing the pistons to reverse their direction of movement in the manner previously explained. This back and forth movement of piston elements 25 and 26, and consequently wiper blades 40 and 42, continues as long as plate 176 remains in running position.

When it is desired to arrest the windshield cleansing operation, plate 176 is moved to its park position, such position of openings 177 and 178 being shown in dotted lines in Fig. 13. In this position, the left hand side of piston 25 and the right hand side of piston 26, as viewed in Fig. 1, are kept subject to exhaust action through ports 69 and 70, passageway 66, port 88, passageways 169, and 170, opening 178, port 175, passageway 173 and vacuum line 13. Since these connections completely bypass bore 163, any movement of piston 193 therein has no effect on the parking movement of the wiper blades. The novel parking means operates in the manner previously described to cause wiper blades 40 and 42 to assume a position of rest against the bottom edge of the windshield.

Having fully disclosed the present invention, and completely described the method of operation thereof, what is claimed as new is:

1. A windshield cleaner comprising a plurality of wiper blades, mounting means for said blades designed to impart an oscillatory motion thereto, a plurality of piston type suction motors each having a piston rod extending therethrough, means in operative engagement with said mounting means and connected to the opposite ends of each of said piston rods forming therewith an endless power transmitting means for imparting motion to said wiper blades, means creating a pressure differential in each of said motors, and means responsive to movement of the pistons in said motors for reversing said pressure differential.

2. A windshield cleaner comprising wiping means, a suction motor drivingly connected to said wiping means, control means adapted to reverse the pressure differential in said motor, said control means including valve means and a pair of opposed pressure chambers for actuating said valve means, a flexible wall hermetically sealing each of said pressure chambers, connecting means extending between said valve means and the side of said flexible walls externally of said pressure chambers, and pilot valve means responsive to a predetermined movement of said motor in either direction and connected to said pressure chambers for reversing the pressure differential between said pressure chambers.

3. A windshield cleaner comprising dual wiper blades, spaced mounting means for said blades designed to impart an oscillatory motion thereto, a pair of piston type fluid motors each having a piston rod extending therethrough, a pair of flexible power transmission elements each in operative engagement with a respective one of said mounting means and connected at its opposite ends to one end of each of said piston rods, said transmission elements and said piston rods forming an endless power transmitting unit for imparting motion to said wiper blades, means creating a pressure differential in each of said motors, and means responsive to movement of the pistons in said motors for reversing said pressure differential.

4. A windshield cleaner comprising plural motors each with a fluid pressure responsive member movable back and forth, flexible power transmission elements having their opposite ends connected respectively to the opposite sides of the pressure responsive members to form therewith an endless power transmitting unit, spaced wiper means each operatively engaged with a respective one of said transmission elements, means creating reverse fluid pressure differentials in said motors, and means for reversing said pressure differentials concurrently, whereby the fluid pressure acts directly upon each side of the endless member.

5. A windshield cleaner comprising plural motors each with a fluid pressure responsive member movable back and forth, a plurality of power transmission elements each having a pair of reversely reciprocable power input ends, said elements having their power input ends connected respectively to the opposite sides of the pressure responsive members to provide in effect therewith an endless power transmitting unit, spaced wiper means each operatively engaged with a respective one of said transmission elements, means creating a fluid pressure differential in each of said motors, and means for reversing said pressure differentials, whereby the fluid pressure acts directly upon each side of the endless member.

6. A windshield cleaner comprising a pair of wiper means, mounting means for said wiper means designed to impart an oscillatory motion thereto, a pair of mechanically independent fluid pressure motors each having a double ended fluid pressure driven part movable back and forth, endless power transmission means in operative engagement at opposite return portions thereof with said mounting means for imparting motion to said wiper blades and including one of said parts in one side and the other part in the other side as continuous portions thereof, means creating a substantially equal pressure differential in each of said motors, and means adapted for reversing said pressure differential.

7. A windshield cleaner comprising a plurality of wiper blades mounted for oscillatory movement across a windshield, each of said wiper blades having a drive part adapted to be actuated by back and forth movement, a plurality of mechanically independent fluid motors each having a fluid pressure driven member therein, endless tension transmitting means in operative engagement with each of said drive parts and including said driven members connected therein at substantially symmetrical points therealong, means creating a substantially equal pressure differential in each of said motors, and means automatically reversing said pressure differential as said wiper blades reach either end of their path of movement.

8. A windshield cleaner comprising plural motors each with a fluid pressure responsive member movable back and forth, flexible power transmission elements having their opposite ends connected respectively to the opposite sides of the pressure responsive members to form therewith an endless power transmitting unit, spaced wiper means each operatively engaged with a respective one of said transmission elements, control means adapted to reverse the pressure differential in said motors, said control means including a piston type valve means and a pair of opposed pressure chambers for actuating said valve means, said piston type valve means forming one wall in each of said pressure chambers, and pilot valve means responsive to a predetermined movement of said one of said motors in either direction and connected to said pressure chambers for reversing the pressure differential between said pressure chambers.

9. A windshield cleaner comprising a plurality of wiper blades having a predetermined path of movement, a drive part connected to each of said wiper blades and adapted to be actuated by back and forth movement, mechanically independent dual suction motors each having a separate double-ended translational power output member, means including cable means and said power output member forming an endless drive means in operative engagement with each wiper blade drive part, means creating a substantially equal pressure differential in each of said motors, and means automatically reversing said pressure differential when said wiper blades reach either end of their path of movement.

10. A windshield cleaner driving means comprising dual suction motors adapted for connection to a plurality of wiper blades, a piston movable through a predetermined path in each of said motors, means including power valve means creating a pressure differential in each of said motors, pilot valve means having a first position responsive to one of said pistons reaching the end of its predetermined path for actuating said power valve means for reversing the pressure differential in each of said motors thereby imparting a reciprocating motion to said pistons, and means causing said pistons to assume a position of rest beyond one end of their predetermined path when the motion thereof is arrested, said pilot valve means having a second position corresponding to the position of rest of the wiper blades to enable said pistons to assume said position of rest.

References Cited in the file of this patent

UNITED STATES PATENTS

| Number | Name | Date |
|---|---|---|
| 1,206,966 | Wilkins | Dec. 5, 1916 |
| 1,424,890 | Tolberth | Aug. 8, 1922 |
| 1,516,722 | Folberth et al. | Nov. 25, 1924 |
| 1,725,436 | Williams | Aug. 20, 1929 |
| 2,045,140 | Horton et al. | June 23, 1936 |
| 2,209,921 | Horton | July 30, 1940 |
| 2,298,197 | Coffey | Oct. 6, 1942 |
| 2,547,175 | Sacchini | Apr. 3, 1951 |
| 2,547,285 | Rappl | Apr. 3, 1951 |

FOREIGN PATENTS

| Number | Country | Date |
|---|---|---|
| 282,372 | Great Britain | of 1928 |